United States Patent
Sahu

(10) Patent No.: US 9,405,592 B2
(45) Date of Patent: Aug. 2, 2016

(54) WORKLOAD BALANCING TO HANDLE SKEWS FOR BIG DATA ANALYTICS

(71) Applicant: Teradata US, Inc., Dayton, OH (US)

(72) Inventor: Birendra Kumar Sahu, Trimulgherry (IN)

(73) Assignee: Teradata US, Inc., Dayton, OH (US)

( * ) Notice: Subject to any disclaimer, the term of this patent is extended or adjusted under 35 U.S.C. 154(b) by 97 days.

(21) Appl. No.: 14/279,911

(22) Filed: May 16, 2014

(65) Prior Publication Data

US 2015/0331724 A1  Nov. 19, 2015

(51) Int. Cl.
G06F 9/46 (2006.01)
G06F 9/50 (2006.01)

(52) U.S. Cl.
CPC .................................. *G06F 9/5083* (2013.01)

(58) Field of Classification Search
None
See application file for complete search history.

(56) References Cited

U.S. PATENT DOCUMENTS

| | | | |
|---|---|---|---|
| 6,327,615 B1 * | 12/2001 | Kasper .................... | H04L 49/90 709/213 |
| 7,058,783 B2 * | 6/2006 | Chandrasekaran ... | G06F 3/0608 707/999.101 |
| 7,072,294 B2 * | 7/2006 | Kasper .................... | H04L 47/10 370/229 |
| 7,457,880 B1 * | 11/2008 | Kim ................... | G06F 17/30171 709/216 |
| 8,209,701 B1 * | 6/2012 | Roytman ............... | G06F 9/5027 718/106 |
| 8,326,825 B2 * | 12/2012 | Nehme et al. ................. | 707/719 |
| 2004/0003103 A1 * | 1/2004 | Witt .................... | G06F 11/1464 709/231 |
| 2004/0196495 A1 * | 10/2004 | Christiansen ......... | G06F 3/1205 358/1.15 |
| 2009/0144748 A1 * | 6/2009 | Foody .................... | G06F 9/5088 718/107 |
| 2010/0318996 A1 * | 12/2010 | Harris .................... | G06F 9/5033 718/102 |
| 2011/0154350 A1 | 6/2011 | Doyle et al. | |
| 2011/0246994 A1 * | 10/2011 | Kimbrel ................ | G06F 9/5027 718/102 |
| 2012/0054306 A1 * | 3/2012 | Vaghani .................. | G06F 3/064 709/217 |
| 2013/0204990 A1 * | 8/2013 | Skjolsvold et al. ........... | 709/223 |
| 2014/0019987 A1 | 1/2014 | Verma et al. | |
| 2014/0026147 A1 | 1/2014 | Cherkasova et al. | |
| 2014/0033223 A1 * | 1/2014 | Swart et al. .................... | 718/105 |
| 2014/0055496 A1 | 2/2014 | Cunningham et al. | |
| 2014/0059552 A1 | 2/2014 | Cunningham et al. | |
| 2014/0067884 A1 | 3/2014 | Tata | |
| 2014/0115064 A1 * | 4/2014 | Calman .................. | G06Q 30/06 709/205 |
| 2014/0136691 A1 * | 5/2014 | Crosby ............... | G06F 11/3476 709/224 |
| 2014/0297585 A1 * | 10/2014 | Chawda et al. ................ | 707/610 |
| 2015/0150018 A1 * | 5/2015 | Hu .......................... | G06F 9/544 718/103 |

OTHER PUBLICATIONS

Gufler et al. "Load Balancing in MapReduce Based on Scalable Cardinality Estimates". 2012 IEEE 28th International Conference on Data Engineering.*

* cited by examiner

Primary Examiner — Adam Lee
(74) Attorney, Agent, or Firm — Schwegman, Lundberg & Woessner, P.A.

(57) ABSTRACT

Data partitions are assigned to reducer tasks using a cost-based and workload balancing approach. At least one of the initial data partitions remains unassigned in an unassigned partitions pool. Each reducer while working on its assigned partitions makes dynamic run-time decisions as to whether to: reassign a partition to another reducer, accept a partition from another reducer, select a partition from the unassigned partitions pool, and/or reassign a partition back to the unassigned partitions pool.

20 Claims, 8 Drawing Sheets

WORKLOAD BALANCING TO HANDLE SKEWS FOR BIG DATA ANALYTICS

BACKGROUND

After over two-decades of electronic data automation and the improved ability for capturing data from a variety of communication channels and media, even small enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

The big data analysis on Hadoop™ Distributed File System (DFS) is usually divided into a number of worker tasks, which are executed in a distributed fashion on the nodes of the cluster.

These worker tasks in Hadoop™ MapReduce™ are executing map and reduce tasks. There are typically a large number of worker tasks, far more than the cluster can execute parallel. In a typical MapReduce™ workload the number of map tasks may be orders of magnitude larger than the number of nodes, and while the number of reduce tasks is usually lower, it will still usually be equal to the number of nodes or a small multiple of that. Each worker task is responsible for processing a part of the job's data. Map tasks process a part of the input split into data portions, and reduce tasks process a partition of the intermediate data.

If worker tasks do not take the same amount of time to execute as remaining tasks, this is called a skewed scenario.

There are number of reasons why skew can occur between worker tasks. Data skew means that not all tasks process the same amount of data. Those tasks that process more input data will likely take longer to execute. Data skew can occur due to the properties of the input data, but also for example, due to a poor choice and use of partitioning functions. Processing skew occurs when not all records in the data take the same amount of time to process. So, even if the tasks process the same amount of data and records, there can still be a large discrepancy in their execution times. This may occur due to the computing resources in the cluster, which are actually heterogeneous, with some nodes having faster processors, more network bandwidth, more memory, or faster disks than others. These nodes will be able to process data faster than the others, and run the same tasks faster.

The end result of these factors is that there can be a large variation between the execution time of the worker tasks. When this occurs, some worker tasks may hold up the execution time of the entire job, either because other worker tasks cannot proceed until they are finished or because they are simply the last worker task in a job.

The applications experience performance degradation due to skews on Hadoop™ DFS. The resources are not fully utilized and performances of big data analytics become delayed. This will impact data warehouse system performance for unified data architectures as other systems tasks become delayed due to delay of data synchronization from Hadoop™ to other systems.

SUMMARY

In various embodiments, methods and a system for workload balancing to handle skews for big data analytics are provided. According to an embodiment, a method for workload balancing to handle skews for big data analytics is provided.

Specifically, a partition total for partitions of data are identified and each partition is assigned to one of a plurality of reducers based on a cost analysis for a cost associated with that reducer processing a proposed assignment of that partition in view of existing partitions already assigned to that reducer. Moreover, at least one partition remains unassigned to any of the reducers.

DETAILED DESCRIPTION

Figure 1:
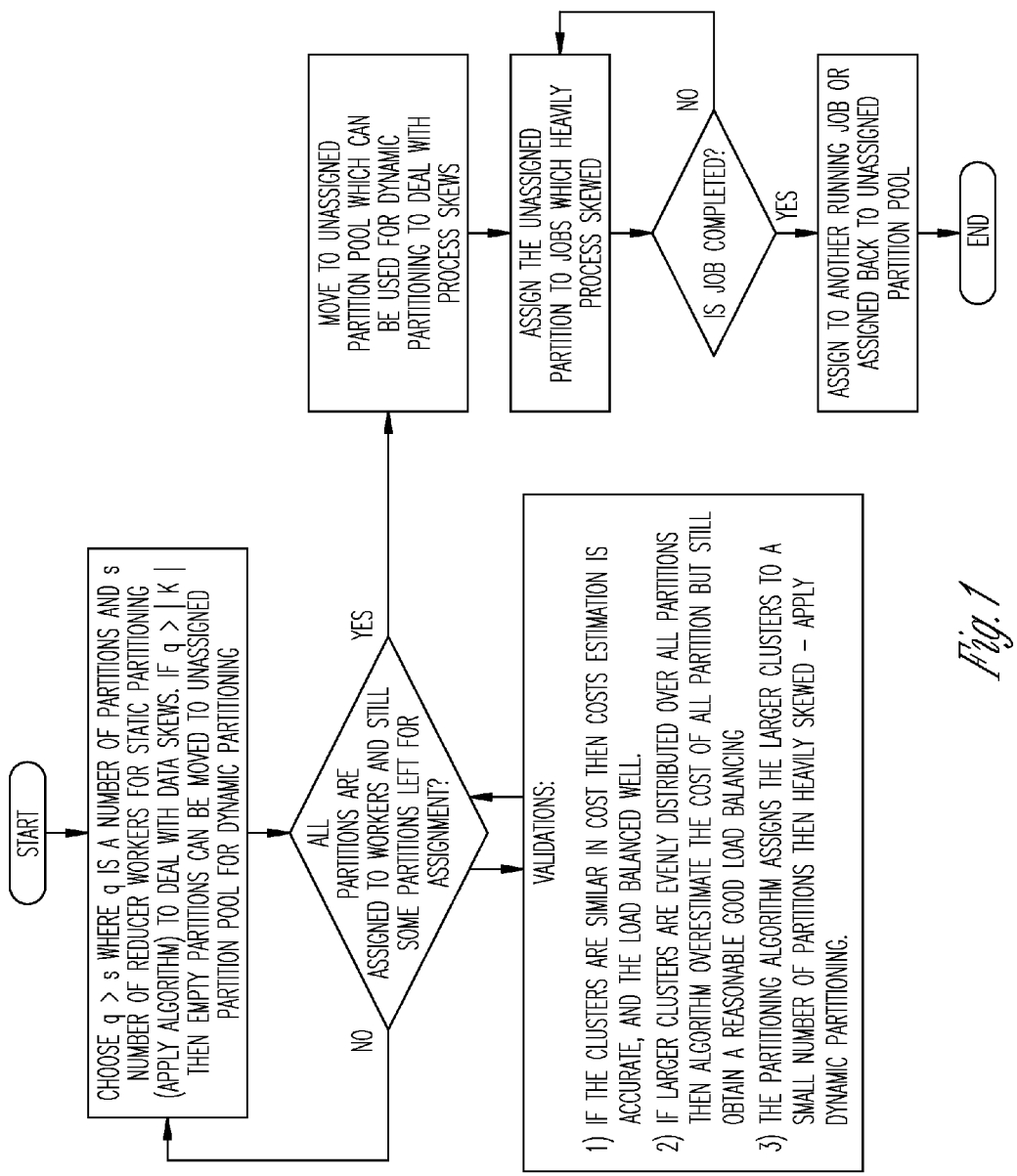
FIG. 1 is a diagram of a method for handling data and processing skews using static and dynamic partition assignments, according to an example embodiment.

The methods and system herein combine different techniques of static and dynamic partitioning to deal with this data and processing skews in map reduce applications. The static partitioning is enhanced with a parallel cost-based hashing technique to reduce the data skews and dynamic partitioning is enhanced for allocation of processors to operations in order to reduce task start-up time and improve task load balancing.

Conventionally, a map phase may reduce systems generate (key, value) pairs from the input data. A cluster is the subset of all (key, value) pairs, sharing the same key. Standard systems, such as Hadoop™ and others, use hashing to distribute the clusters to the reducers. Each reducer gets approximately the same number of clusters. For skewed data, this approach is not good enough since clusters may vary considerably in size. With nonlinear reducers, the problem is even worse. The nonlinear reduce function is evaluated for each cluster and even sets of clusters with the same overall number of tuples can have very different execution times. Processing a small number of large clusters takes much longer than processing many small clusters.

The methods and system provided herein teach a cost-based model addition to existing static partitioning that takes into account non-linear reducer functions and skewed data distributions. Instead of considering only the size of the data partition (set of clusters) that is assigned to each reducer, an estimate of execution cost for the data partition is also considered.

The input data that requires processing is split into a fixed number of partitions. The number of partitions selected is larger than the number of reducers and the goal is to distribute the partitions, such that the execution times for all reducers are similar.

With MapReduce™ functions during the map phase the framework splits input data set into a number of partitions and assigns each partition to a map task. The framework also distributes the many map tasks across the cluster of nodes on which it operates. Each map task consumes key/value pairs from its assigned partition and produces a set of intermediate key/value pairs.

Following the map phase the framework sorts the intermediate data set by key and produces a set of key/value tuples so that all the values associated with a particular key appear together. Conventionally, but unlike what is proposed herein, it also partitions the set of tuples into a number of partitions equal to the number of reduce tasks.

In the reduce phase, each reduce task consumes the fragment of the tuples assigned to it. For each such tuple, each reduce task invokes a user-defined reduce function that transmutes the tuple into an output key/value pair (K,V). Once again, the framework distributes the many reduce tasks across the cluster of nodes and deals with shipping the appropriate fragment of intermediate data to each reduce task.

It is within this context that various embodiments of the invention are now discussed with reference to the FIGS. 1-5.

FIG. 1 is a diagram of a method for handling data and processing skews using static and dynamic partition assignments, according to an example embodiment. The method is implemented as executable instructions within a non-transitory computer-readable storage medium that execute on one or more processors, the processors specifically configured to execute the method. Moreover, the executable instructions are programmed within a non-transitory computer-readable storage medium and/or memory. The method is also operational over a network; the network is wired, wireless, or a combination of wired and wireless.

The method creates more partitions than there are reducers in a map reduce system. This provides a high degree of freedom for balancing the workload on the reducers to deal with skew conditions. The method chooses q>s, in contrast to current map reduce systems where q=s. The range of q is obviously bounded by the number of reducer s, on the lower end, and the number of clusters, |K|, on the upper end. With q<s, some reducers would not obtain any input will be moved to an unassigned pool. With q>|K|, some partitions will remain empty.

The number of partitions, q, influences the quality of the obtained load balancing. The higher q, the more possibilities the controller has to balance the load. To avoid excessive management, overhead grows with q, so more monitoring data is collected and processed. The method picks the most expensive partition, which is not yet assigned to a reducer and assigns it to the reducer, which has smallest total load.

The load of a reducer is the sum of the costs for all partitions assigned to that reducer. We repeat these steps until all partitions have been assigned either to a reducer task or to an unassigned pool.

```
Input: W: {1, 2, 3 ..., q}
Output: R: a set of partition bundles
Unassigned Pool: UP
R=0
P = {1, 2, 3 ..., q}
While P <> 0 do
  P ← P \ {q}
  If |R| < s then
    R ← R U {{q}}
  Else If |R| >= s then
    UP ← P \ {q}
End while
Return R
```

Once partitions are assigned to reducer tasks and to the unassigned pool, the reducer tasks are in control (dynamic partitioning) to reassign partitions to other reducers, to acquire another partition from the unassigned pool, and/or to reassign partitions back to the unassigned pool.

FIGS. 2A-2D are diagrams depicting sample scenarios for partition assignments to two tasks using static and dynamic partitioning, according to an example embodiment. These diagrams are presented for purposes of illustration and comprehension of the methods and system discussed herein. As it is to be understood that there can be q partitions and s reducers (the two reducers are identified as "Reduce Worker Task 1 and 2 in the FIGS. 2A-2D.

The dynamic partition works by having a pool of unassigned partitions from which tasks select partitions. Tasks are assigned partitions from the unassigned pool or when the unassigned pool is depleted a task can be assigned partitions from other tasks to work on.

Figure 2A:
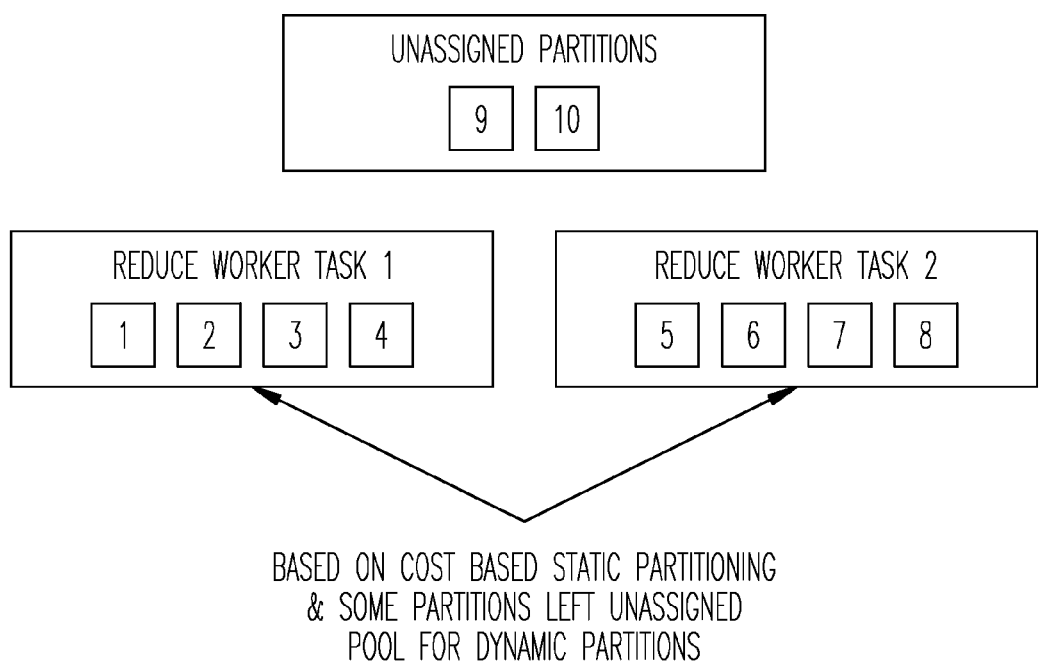
FIGS. 2A-2D are diagrams depicting sample scenarios for partition assignments to two tasks, according to an example embodiment.

FIG. 2A depicts partitions 1-10, partitions 1-4 are assigned to Reducer Worker Task 1, partitions 5-8 are assigned to Reducer Worker task 2, and partitions 9-10 are as of yet unassigned in the example scenario and are in an Unassigned Partitions Pool.

The initial assignments are achieved using the technique discussed above with the FIG. 1; a cost-based static partitioning assignment with partitions 9-10 left for dynamic assignment.

Figure 2B:
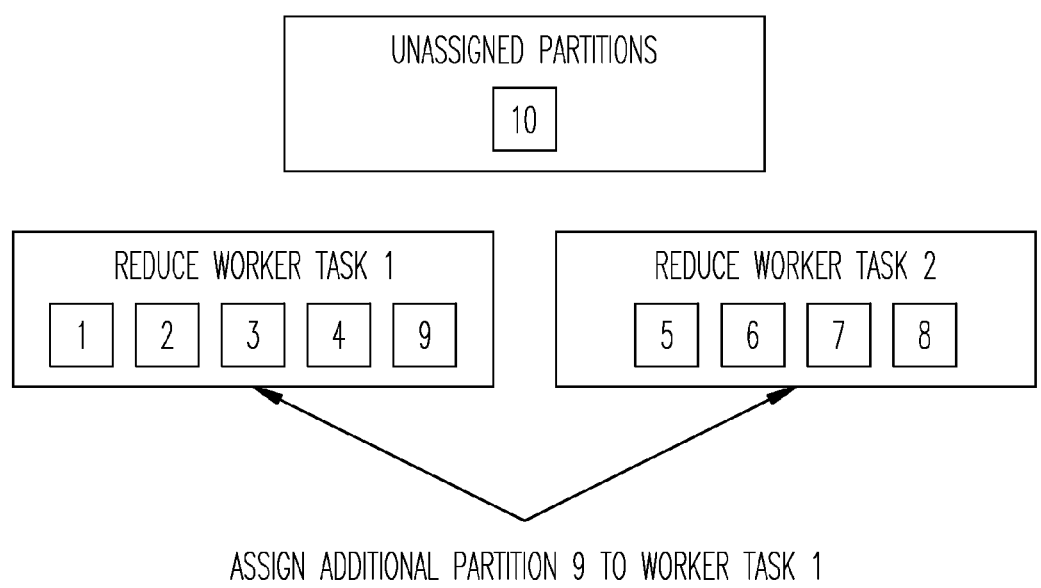

FIG. 2B depicts assignment of partition 9 from the Unassigned Partitions Pool to Reduce Worker Task 1, in the example scenario. Reduce Worker Task 1 makes the decision to dynamically acquire partition 9.

Figure 2C:
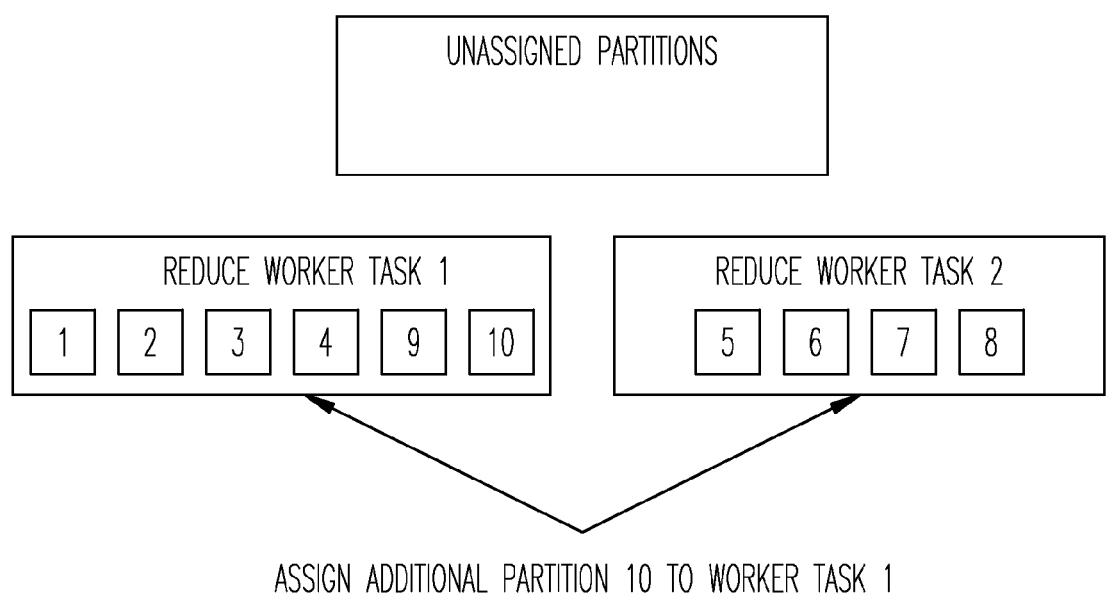

FIG. 2C depicts assignment of partition 10 from the Unassigned Partitions Pool to Reduce Worker Task 2, in the example scenario. Reduce Worker Task 1 makes the decision to dynamically acquire partition 10.

Figure 2D:
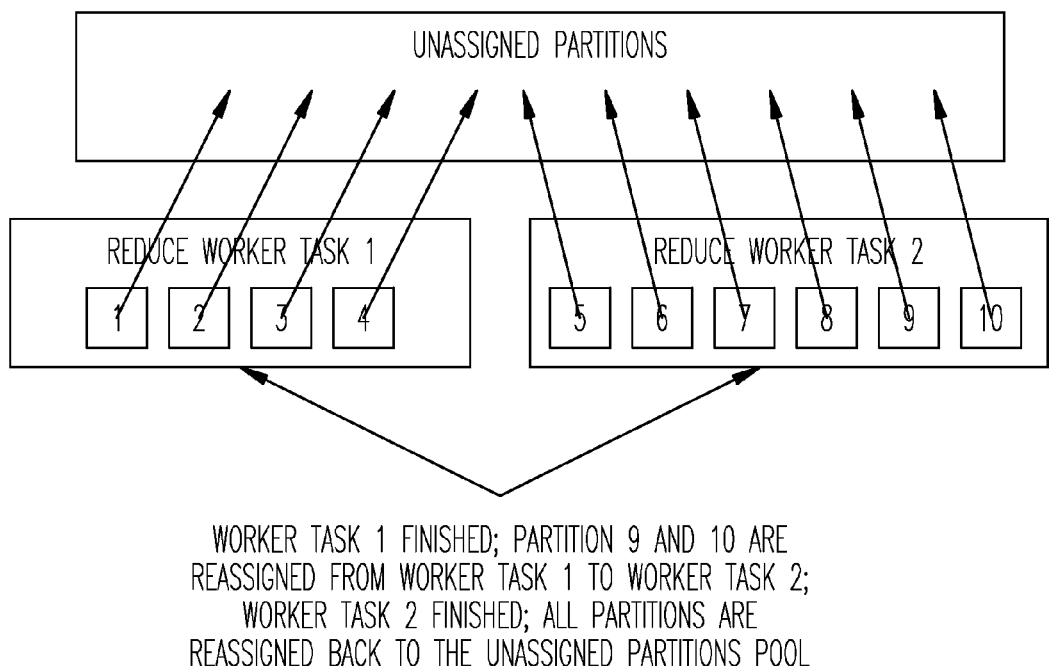

FIG. 2D depicts a task-to-task assignment of partitions 9 and 10 from Reduce Worker Task 1 to Reduce Worker Task 2. FIG. 2D also depicts tasks reassignments of partitions 1-10 back to the Unassigned Partitions Pool. The Reduce Worker Tasks 1 and 2 make the decisions to transfer between one another and to reassign partitions back to the Unassigned Partition Pool.

As a result, the partitions are more uniformly assigned and reassigned based on cost-based static partitioning with load balancing, at run time, and using dynamic partitioning to achieve non-skewed distributions for purposes of finishing the jobs more quickly and efficiently.

Prior attempts to address data and processing skews have used specialized backup tasks or sampling approaches. Yet, such approaches only partially solve issues related to data and processing skewing.

The methods and systems discussed herein more completely address data and processing skews than prior attempts have. Both the data skew and the processing skew are solved by using a cost-based static partitioning assignment to tasks with unassigned partitions, which are dynamically addressed at run time by the tasks (the tasks choose to reassign to other tasks, select from the unassigned pool, and/or reassign back to the unassigned pool).

Figure 3:
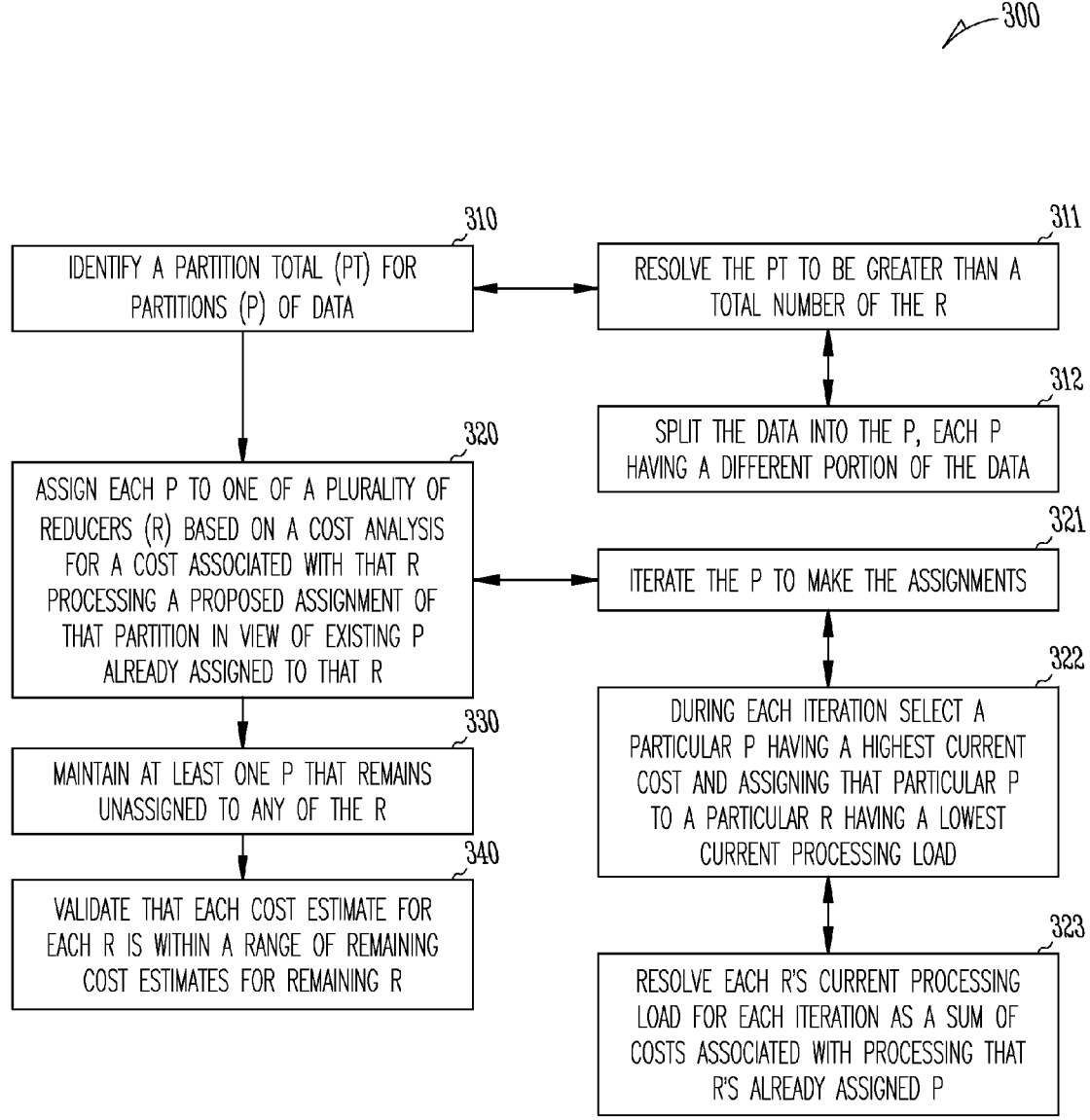
FIG. 3 is a diagram of another method for workload balancing to handle skews for big data analytics, according to an example embodiment.

FIG. 3 is a diagram of another method 300 for workload balancing to handle skews for big data analytics, according to an example embodiment. The method 300 is implemented as executable instructions (one or more software modules referred to herein as "workload balancer") within a non-transitory computer-readable storage medium that execute on one or more processors, the processors specifically configured to execute the workload balancer. Moreover, the workload balancer is programmed within a non-transitory computer-readable storage medium and/or memory. The workload balancer is also operational over a network; the network is wired, wireless, or a combination of wired and wireless.

The processing perspective of the workload balancer is from that which was discussed above where a cost-based static partitioning assignment is made to reducer tasks and to an unassigned pool from which the tasks can later select from.

Initially, a block of data is obtained for processing, such as from a distributed file system associated with processing data on behalf of one or more operations of distributed database management system or data warehouse. The block of data can be associated with processing query results, importing data, exporting data, and others.

At 310, the workload balancer identifies a partition total for partitions of the block of data. The partition total is a total number of partitions that the block of data is split into. The reducers process different ones of the partitions.

According to an embodiment, at 311, the workload balancer resolves or determines the partition total to be greater than a total number of reducers. This was discussed above with reference to the FIG. 1.

In an embodiment of 311 and at 312, the workload balancer splits the block of data into each of the partitions; again, each of the partitions representing a different portion from the block of data. It is noted that each partition may or may not have the same amount of data (same size).

At 320, the workload balancer assigns each partition to one of the reducers. This is done based on a cost estimate (analysis) for a cost associated with processing a particular partition that is being assigned. The cost analysis can include a variety of factors, such as the size of the partition that is being assigned, the complexity of the data for the partition, and the like. The assignment is also done based on the existing assigned partitions to the reducers. This ensures load balancing across the reducers based on cost estimates.

In an embodiment, at 321, the workload balancer iterates the partitions (for a partition total number of times) to make the assignments of sets of the partitions to the reducers.

In an embodiment of 321 and at 322, the workload balancer, during each iteration, selects a particular partition having a highest current cost relative to cost for all existing unassigned partitions and assigns that particular partition to a particular reducer having a lowest current processing load relative to all the available reducers.

In an embodiment of 322 and at 323, the workload balancer resolves each reducer's current processing load (for this iteration) as a sum of the costs associated with processing that reducer's already assigned partitions.

At 330, the workload balancer maintains at least one partition as being unassigned. This was discussed above with reference to the FIGS. 1-2. The partitions are assigned initially (320) in a load balanced fashion and at least one partition remains unassigned for dynamically allocation or acquisition by the reducers (discussed above with reference to the FIGS. 1-2 and more below with reference to the FIGS. 4-5).

According to an embodiment, at 340, the workload balancer validates after assigning the assigned partitions to the reducers that each cost estimate for each reducer is within a range of remaining cost estimates for remaining reducers. This ensures that the assignments are sufficiently balanced across the reducers before dynamic adjustments are made during partition processing by each of the reducers (discussed below with reference to the FIG. 4).

Figure 4:
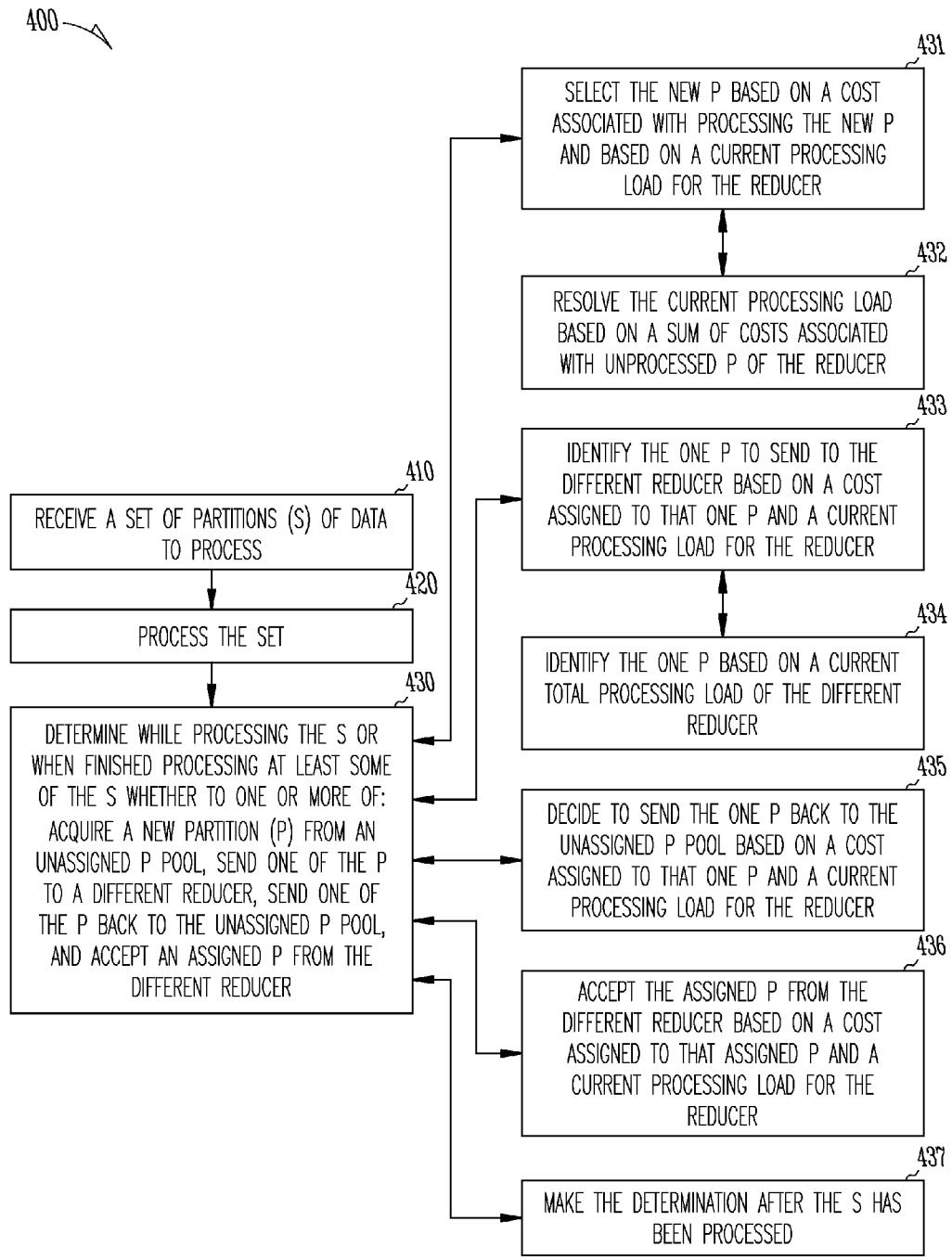
FIG. 4 is a diagram of still another method for workload balancing to handle skews for handle big data analytics, according to an example embodiment.

FIG. 4 is a diagram of still another method 400 for workload balancing to handle skews for handle big data analytics, according to an example embodiment. The method 400 is implemented as executable instructions (one or more software modules, hereinafter "reducer task") within a non-transitory computer-readable storage medium that execute on one or more processors, the processors specifically configured to execute the reducer task. Moreover, the reducer task is programmed within a non-transitory computer-readable storage medium and/or memory. The reducer task is also operational over a network; the network is wired, wireless, or a combination of wired and wireless.

The processing perspective of the reducer task is from that of a reducer task during operation on assigned partitions. The reducer task was initially assigned partitions of data to work on from the workload balancer of the FIG. 3, and the reducer task dynamically makes decisions when to reassign a partition to another reducer task, reassign a partition back to an unassigned pool, and select a partition to work on from the unassigned pool.

It is noted that multiple instances of the reducer task are simultaneously in operation and can be referred to herein as: another reducer task, another instance of the reducer task, and the like.

At 410, the reducer task receives a set of partitions of data to process. The partitions received were assigned based on a cost analysis by the workload balancer of the FIG. 3.

At 420, the reducer task begins processing the set of partitions performing the functions it is configured to perform on the data associated with its set of partitions.

At 430, the reducer task determines, while processing the set of partitions or when finished processing at least some of the partitions whether to perform one or more of: acquire a new partition from an unassigned pool, send one of the partitions to a different reducer (different instance of the reducer task operating on a different set of partitions), send one of the partitions back to the unassigned partition pool, and accept an assigned partition from the different reducer.

In an embodiment, at 431, the reducer task selects the new partition based on a cost associated with processing the new partition and based on a current processing load for the reducer task.

In an embodiment of 431 and at 432, the reducer task resolves the current processing load based on a sum of costs associated with unprocessed partitions from the set that the reducer task is processing.

In an embodiment, at 433, the reducer task identifies one partition from the set that is unprocessed to send to the different reducer based on a cost assigned to that one partition and a current processing load for the reducer task.

In an embodiment of 433 and at 434, the reducer task also identifies the one partition based on a current total processing load of the different reducer.

In an embodiment, at 435, the reducer task decides to send the one partition back to the unassigned partition pool based on a cost assigned to that one partition and a current processing load for the reducer task.

In an embodiment, at 436, the reducer task accepts the assigned partition from the different reducer based on a cost assigned to that assigned partition and a current processing load for the reducer.

In an embodiment, at 437, the reducer task makes the determination after the set of partitions has been processed.

It is now understood how the unassigned partition pool and the reducer task along with remaining instances of the reducer task cooperate dynamically at run time to make partition assignments to more efficiently process the data. This improves processing throughput and is particularly noticeable in large-scale data processing environments.

Figure 5:
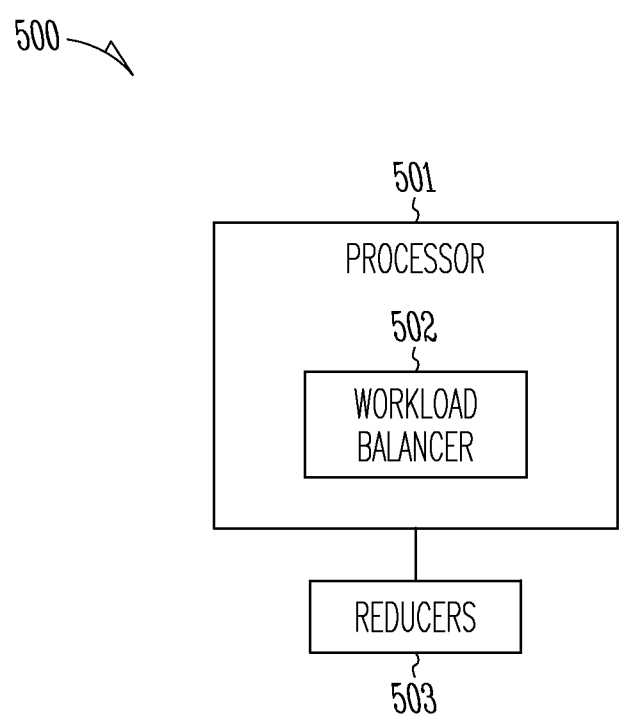
FIG. 5 is a diagram of a skew handling system, according to an example embodiment.

FIG. 5 is a diagram of a skew handling system 500, according to an example embodiment. The skew handling system 500 is implemented as one or more software and hardware components. The software components may be referred to as modules and are executable instructions within a non-transitory computer-readable storage medium that execute on one or more processors of the skew handling system 500, the processors specifically configured to execute the software components. Moreover, the software components are programmed within a non-transitory computer-readable storage medium and/or memory. The skew handling system 500 is also operational over a network; the network is wired, wireless, or a combination of wired and wireless.

In an embodiment, the skew handling system 500 implements the techniques discussed above with the FIGS. 1 and 2A-2D.

In an embodiment, the skew handling system 500 implemented the techniques discussed above with the FIGS. 3-4.

The skew handling system 500 includes at least one processor 501 associated with at least one device and a workload balancer 502.

The workload balancer 502 is adapted and configured to: execute on the at least one processor 501 of the at least one device, assign partitions of data to reducers 503 based on a cost analysis, and retain at least one partition in an unassigned partition pool.

Each reducer 503 is adapted and configured to (while processing that reducer's assigned partitions) decide whether to: dynamically offload one or more of those partitions to a different reducer 503, dynamically offload one or more of those partitions to the unassigned partition pool, dynamically select a new partition from the unassigned partition pool, and dynamically accept a different partition from the different reducer 503.

According to an embodiment, the partitions of data are associated with a distributed file system.

In an embodiment, the data is associated with a query of a database management system.

In an embodiment, the workload balancer 502 is further adapted and configured to split the data into partitions.

In an embodiment, the workload balancer 502 is further adapted and configured to create a total number of the partitions to ensure that the total number of partitions is greater than a total number of the reducers 503.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
    identifying, by a workload balancer executing on at least one processor in a map reduce system, a partition total for partitions of data;
    assigning, by the workload balancer, one or more of the partitions to one of a plurality of reducers by processing a cost analysis that assigns a cost estimate for that reducer when processing a proposed assignment of the one or more partitions in addition to existing partitions already assigned to that reducer;
    identifying, by the workload balancer, a data skew and data size for data in the existing partitions and in the proposed assigned one or more partitions for assigning the cost estimate; and
    maintaining, by the workload balancer, at least one partition that remains unassigned to any of the reducers in an unassigned partition pool.

2. The method of claim 1, wherein identifying further includes resolving the partition total to be greater than a total number of the reducers.

3. The method of claim 2, wherein resolving further includes splitting the data into the partitions, each partition having a different portion of the data.

4. The method of claim 1, wherein assigning further includes iterating the partitions to make the assignments.

5. The method of claim 4, wherein iterating further includes during each iteration selecting a particular partition having a highest current cost and assigning that particular partition to a particular reducer having a lowest current processing load.

6. The method of claim 5, wherein selecting further includes resolving each reducer's current processing load for each iteration as a sum of costs associated with processing that reducer's already assigned partitions.

7. The method of claim 1 further comprising, validating, by the workload balancer that each cost estimate for each reducer is within a range of remaining cost estimates for remaining reducers.

8. A method, comprising:
    maintaining, by a workload balancer in a map reduce system, at least one partition of data that remains unassigned to any of a plurality of reducers in an unassigned partition pool;
    receiving, by a reducer executing on at least one processor, a set of partitions of data to process;
    processing, by the reducer, the set; and
    determining, by the reducer, while processing the set or when finished processing at least some of the set whether to one or more of: acquire a new partition from the unassigned partition pool, send one of the partitions in the set to a different reducer, send one of the partitions in the set back to the unassigned partition pool, and accept an assigned partition from the different reducer.

9. The method of claim 8, wherein determining further includes selecting the new partition based on a cost for processing the new partition and based on a current processing load for the reducer and determining the cost by processing a cost analysis that assigns the cost and the current processing load by identifying a size of the data and data skew for existing partitions that are unprocessed by the reducer.

10. The method of claim 9, wherein selecting further includes determining the current processing load by identifying for each existing partition's data size and data skew and assigning each existing partition a cost estimate and summing all the cost estimates for the existing partitions.

11. The method of claim 8, wherein determining further includes identifying the one partition to send to the different reducer by identifying a cost assigned to that one partition and a current processing load for the reducer by processing the cost analysis for that different reducer.

12. The method of claim 11, wherein identifying further includes identifying the one partition by identifying a current total processing load of the different reducer by identifying data sizes and data skews for all unprocessed partitions being processed by that different reducer.

13. The method of claim 8, wherein determining further includes deciding to send the one partition back to the unassigned partition pool by determining a cost assigned to that one partition and a current processing load for the reducer by assigning the cost by identifying data sizes and data skews for all unprocessed partitions being processed by that one partition.

14. The method of claim 8, wherein determining further includes accepting the assigned partition from the different reducer by determining a cost assigned to that assigned partition by assigning the cost after identifying a data size and data skew for that assigned partition and accepting the assigned partition by determining a current processing load for the reducer by identifying data sizes and data skews for unprocessed partitions of the reducer.

15. The method of claim 8, wherein determining further includes making the determination after the set has been processed.

16. A map reduce system, comprising:
a processor; and
a workload balancer adapted and configured to: i) execute on the processor, ii) assign partitions of data to reducers by processing a cost analysis that assigns cost estimates to the reducers by identifying data sizes and data skews for assigned and unprocessed partitions of those reducers, and iii) retain at least one partition in an unassigned partition pool;
wherein each reducer is adapted and configured to, while processing that reducer's assigned partitions, decide whether to: i) dynamically offload one or more of those partitions to a different reducer, ii) dynamically offload one or more of those partitions to the unassigned partition pool, iii) dynamically select a new partition from the unassigned partition pool, and iv) dynamically accept a different partition from the different reducer.

17. The system of claim 16, wherein the partitions of data are partitions stored in a distributed file system.

18. The system of claim 16, wherein the data is data being processed with a query of a database management system.

19. The system of claim 16, wherein the workload balancer is further adapted and configured to, in ii), split that data into the partitions.

20. The system of claim 19, wherein the workload balancer is further adapted and configured to, in ii), create a total number of the partitions to ensure the total number of the partitions is greater than a total number of the reducers.

* * * * *